US011964468B2

(12) United States Patent
Yamamoto

(10) Patent No.: US 11,964,468 B2
(45) Date of Patent: Apr. 23, 2024

(54) PRINTER FOR PRINTING ON RECORDING PAPER HAVING RECORDING SURFACE AND ADHESIVE SURFACE

(71) Applicant: SEIKO EPSON CORPORATION, Tokyo (JP)

(72) Inventor: Kazutaka Yamamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 21 days.

(21) Appl. No.: 17/807,888

(22) Filed: Jun. 21, 2022

(65) Prior Publication Data

US 2022/0402279 A1 Dec. 22, 2022

(30) Foreign Application Priority Data

Jun. 22, 2021 (JP) ................................. 2021-103567

(51) Int. Cl.

*B41J 11/00* (2006.01)
*B41J 11/70* (2006.01)
*B41J 15/04* (2006.01)
*B41J 2/32* (2006.01)
*B41J 3/407* (2006.01)

(52) U.S. Cl.

CPC ............ *B41J 11/0045* (2013.01); *B41J 11/70* (2013.01); *B41J 15/04* (2013.01); *B41J 15/044* (2013.01); *B41J 15/046* (2013.01); *B41J 2/32* (2013.01); *B41J 3/4075* (2013.01); *B41J 15/042* (2013.01)

(58) Field of Classification Search

CPC ...... B41J 11/0045; B41J 3/4075; B41J 11/70; B41J 15/046; B41J 15/042; B41J 2/32; B41J 15/04; B41J 15/044

See application file for complete search history.

(56) References Cited

U.S. PATENT DOCUMENTS 9,186,920 B2 11/2015 Kikura et al.
9,862,205 B2 1/2018 Obara
10,843,490 B2 11/2020 Sekine et al.
2003/0121607 A1* 7/2003 Davis ................. H05K 13/0417 156/719
2009/0028623 A1* 1/2009 Yokoyama ............. B41J 3/4075 400/613
2014/0099149 A1* 4/2014 Kikura ................... B41J 15/046 400/619

(Continued)

FOREIGN PATENT DOCUMENTS

CN 106457850 2/2017
JP 2013-075484 A 4/2013

(Continued)

*Primary Examiner* — Henok D Legesse

(74) *Attorney, Agent, or Firm* — WORKMAN NYDEGGER

(57) ABSTRACT

A printer includes a rolled paper holder that accommodates rolled paper wound with recording paper having a recording surface and an adhesive surface provided on a side opposite to the recording surface, a platen roller that comes into contact with the adhesive surface and draws and feeds the recording paper from the rolled paper, a thermal head that performs printing on the recording surface, and a first guide portion that comes into contact with the recording surface and guides the recording paper, and the first guide portion has a first friction reduction portion that reduces a friction force generated between the recording surface and the first guide portion.

11 Claims, 6 Drawing Sheets

(56) References Cited

U.S. PATENT DOCUMENTS

| | | | |
|---|---|---|---|
| 2015/0092003 A1 | 4/2015 | Ishii et al. | |
| 2017/0266996 A1 | 9/2017 | Obara | |
| 2019/0381814 A1* | 12/2019 | Sekine | B41J 11/04 |

FOREIGN PATENT DOCUMENTS

| | | | |
|---|---|---|---|
| JP | 2014-076544 A | 5/2014 |
| JP | 2015-71476 A | 4/2015 |
| JP | 2019-217635 A | 12/2019 |
| KR | 10-2016-0140910 A | 12/2016 |

* cited by examiner

PRINTER FOR PRINTING ON RECORDING PAPER HAVING RECORDING SURFACE AND ADHESIVE SURFACE

The present application is based on, and claims priority from JP Application Serial Number 2021-103567, filed Jun. 22, 2021, the disclosure of which is hereby incorporated by reference herein in its entirety.

BACKGROUND

1. Technical Field

The present disclosure relates to a printer.

2. Related Art

As disclosed in JP-A-2015-071476, a printer including a recording paper guide that comes into contact with an adhesive surface of a liner-less label and guides the liner-less label has been known. The recording paper guide is provided with a projection that suppresses the adhesive surface of the liner-less label from adhering to the recording paper guide.

Similar to the liner-less label, in rolled paper wound with recording paper having a recording surface and an adhesive surface, an adhesive applied to the adhesive surface may be transferred to the recording surface and remain on the recording surface. In this case, the recording surface of the recording paper adheres to a member that comes into contact with the recording surface and may causes paper jamming.

SUMMARY

The present disclosure is a printer including a rolled paper holder configured to accommodate rolled paper wound with recording paper having a recording surface and an adhesive surface provided on a side opposite to the recording surface, a feeding roller configured to come into contact with the adhesive surface and configured to draw and feed the recording paper from the rolled paper, a printing head configured to perform printing on the recording surface, and a first guide portion configured to come into contact with the recording surface and configured to guide the recording paper, in which the first guide portion is configured to have a first friction reduction portion that reduces a friction force generated between the recording surface and the first guide portion.

DESCRIPTION OF EXEMPLARY EMBODIMENTS

Hereinafter, with reference to the attached drawings, a printer 1, which is an embodiment of the printer, will be described. Note that, in the following description, directions based on an XYZ orthogonal coordinate system indicated in each figure will be used, but these directions are used only for convenience of explanation and do not limit the following embodiments.

Figure 1:
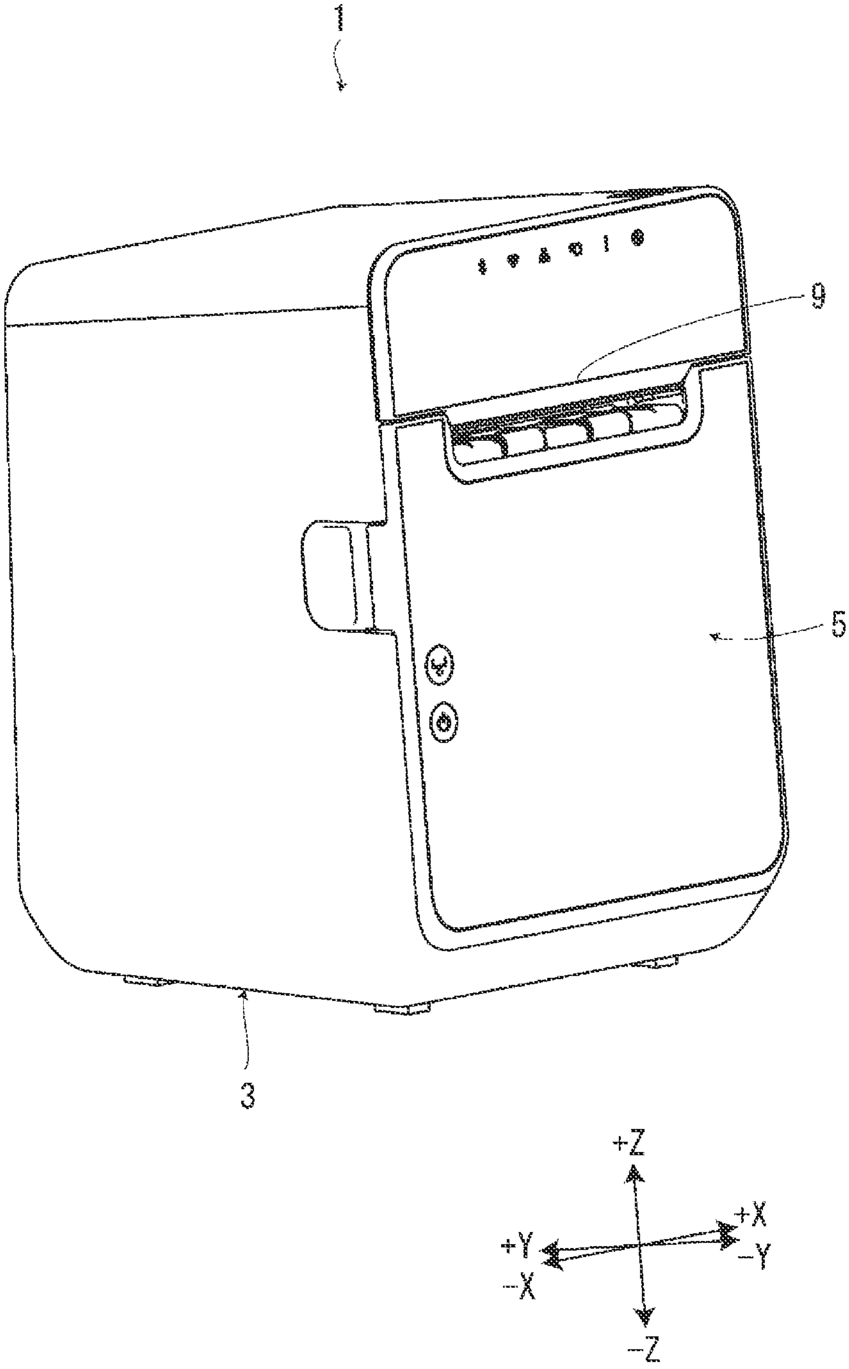
FIG. 1 is a perspective view of a printer when an opening/closing cover is closed.
Figure 2:
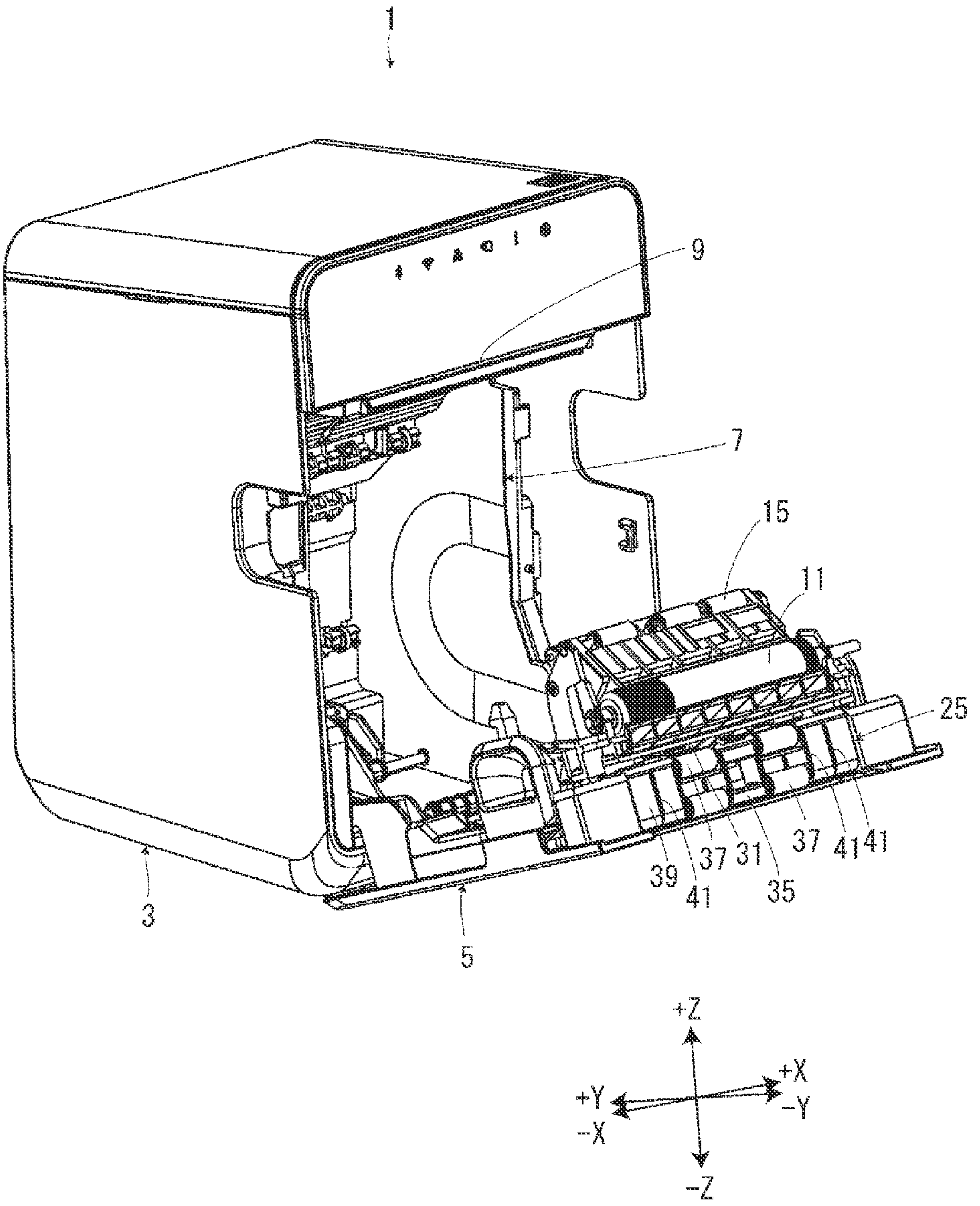
FIG. 2 is a perspective view of the printer when the opening/closing cover is open.

As illustrated in FIGS. 1 and 2, the printer 1 is formed in a substantially rectangular parallelopiped shape and includes an apparatus body 3 and an opening/closing cover 5.

The apparatus body 3 is formed in a box shape with one surface in the −Y direction open, and a rolled paper holder 7 is provided in the apparatus body 3. The rolled paper holder 7 accommodates rolled paper R wound with recording paper P, which is a printing medium (see FIG. 3). The rolled paper R is charged into the rolled paper holder 7 by a drop-in method. The printer 1 performs printing on the recording paper P that is drawn from the rolled paper R accommodated in the rolled paper holder 7.

The recording paper P includes a recording surface Pa and an adhesive surface Pb provided on a side opposite to the recording surface Pa. An adhesive is applied to the adhesive surface Pb. No mount is affixed on the adhesive surface Pb and the adhesive surface Pb is exposed. This means that the recording paper P is a, so-called, liner-less label. The rolled paper R is wound with the recording paper P such that the recording surface Pa is the outside and the adhesive surface Pb is the inside. In the rolled paper R, the recording surface Pa and the adhesive surface Pb are in contact with each other.

The opening/closing cover 5 opens and closes the rolled paper holder 7. The opening/closing cover 5 is attached to an end portion of the apparatus body 3 in the −Y direction and the −Z direction, so as to be rotatable around an axis that is substantially parallel to the X direction. A discharge outlet 9 is provided between an end of the opening/closing cover 5, that is, an end portion in the +Z direction and the apparatus body 3. The discharge outlet 9 is formed in a substantially rectangular shape long in the X direction. From the discharge outlet 9, the recording paper P on which printing has been performed is discharged.

Figure 3:
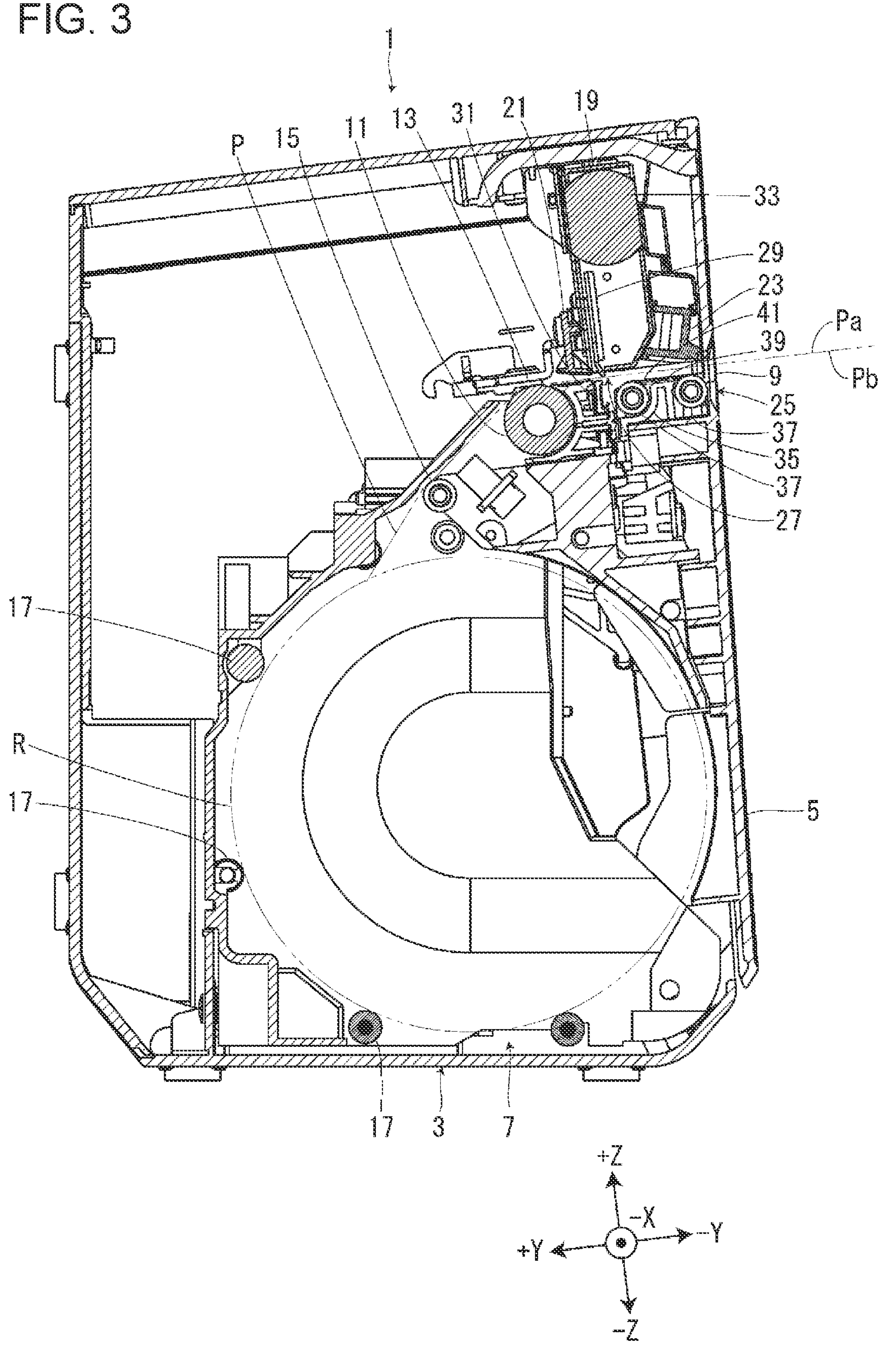
FIG. 3 is a cross sectional view of the printer.

As illustrated in FIG. 3, the printer 1 includes a platen roller 11, a thermal head 13, a relay roller 15, a plurality of rolled paper guide rollers 17, a cutter 19, a first portion 21, a second portion 23, and a second guide portion 25. The platen roller 11, the relay roller 15, the rolled paper guide rollers 17, and a discharge roller 37 described later are provided so that rotation axis directions thereof are substantially parallel to the X direction. In addition, a route along which the recording paper P is fed is called a feeding route 27. The recording paper P drawn from the rolled paper R is fed to the discharge outlet 9 through the feeding route 27.

The platen roller 11 is provided inside the opening/closing cover 5 so as to face the thermal head 13 across the feeding route 27. The platen roller 11 pinches the recording paper P with the thermal head 13 and rotates using a feeding motor (not illustrated) as a driving source to draw the recording paper P from the rolled paper R and feed the recording paper P in the −Y direction toward the discharge outlet 9. The platen roller 11 comes into contact with the adhesive surface Pb of the recording paper P.

The thermal head 13 is provided in the apparatus body 3 so as to be located on a side opposite to the platen roller 11 with respect to the feeding route 27. The thermal head 13 comes into contact with the recording surface Pa of the recording paper P. The thermal head 13 includes a plurality of heating elements (not illustrated) and performs printing on the recording surface Pa of the recording paper P drawn from the rolled paper R.

The relay roller 15 is provided inside the opening/closing cover 5 so as to be located, in the feeding route 27, between the rolled paper holder 7 and the platen roller 11. As the relay roller 15 comes into contact with the recording paper P that is fed to the platen roller 11 from the rolled paper holder 7, the relay roller 15 rotates and guides feeding of the recording paper P between the rolled paper holder 7 and the platen roller 11.

The plurality of rolled paper guide rollers 17 is provided inside the rolled paper holder 7 so as to come into contact with the outer peripheral surface of the rolled paper R accommodated in the rolled paper holder 7. The rolled paper guide rollers 17 guide rotation of the rolled paper R accompanying drawing of the recording paper P.

The cutter 19 is provided, in the feeding route 27, between the thermal head 13 and the discharge outlet 9. The cutter 19 cuts the recording paper P in the rear of a printed portion in the width direction, that is, the X direction of the recording paper P. The cutter 19 has a movable blade 29, a fixed blade 31, and a cutter motor 33. The movable blade 29 and the cutter motor 33 are provided in the apparatus body 3, being located between the thermal head 13 and the discharge outlet 9.

The movable blade 29 is brought into contact with and separated from the fixed blade 31 using the cutter motor 33 as a driving source and cuts the recording paper P between the movable blade 29 and the fixed blade 31. The fixed blade 31 is provided inside the opening/closing cover 5 so as to face the movable blade 29 across the feeding route 27. Note that the blade edge of the movable blade 29 is provided with a cut-away section (not illustrated) so that the movable blade 29 cuts the recording paper P leaving a part in the width direction of the recording paper P. As a result, the cut recording paper P remains in the discharge outlet 9 without falling from the discharge outlet 9.

The first portion 21, the second portion 23, and the second guide portion 25 are provided, in the feeding route 27, between the thermal head 13 and the platen roller 11, and the discharge outlet 9 and guides the recording paper P in the thickness direction of the recording paper P, that is the Z direction. The first portion 21 and the second portion 23 are provided in the apparatus body 3 so as to be located on the same side as the thermal head 13 with respect to the feeding route 27 and comes into contact with the recording surface Pa of the recording paper P. The second guide portion 25 is provided inside the opening/closing cover 5 so as to be located on the same side as the platen roller 11 with respect to the feeding route 27 and comes into contact with the adhesive surface Pb of the recording paper P. The recording paper P that has passed the thermal head 13 and the platen roller 11 passes between the first portion 21 and the second portion 23, and the second guide portion 25 and is fed to the discharge outlet 9.

The first portion 21 is located between the thermal head 13 and the cutter 19 and is attached to the cutter 19. The second portion 23 is located between the cutter 19 and the discharge outlet 9 and is attached to the cutter 19. Details of the first portion 21 and the second portion 23 will be described later.

The second guide portion 25 includes a roller support member 35 and two discharge rollers 37. The roller support member 35 rotatably supports the discharge rollers 37. The surface of the roller support member 35 in the +Z direction, that is, the surface facing the feeding route 27 is called a discharge guide surface 39.

From the discharge guide surface 39, a plurality of discharge guide projections 41 is projecting and arranged in the X direction, that is, the width direction of the recording paper P (see FIG. 2). The discharge guide projections 41 are formed in a rib shape extending in the Y direction, that is, the feeding direction of the recording paper P. The adhesive surface Pb of the recording paper P comes into contact only with the discharge guide projections 41 of the discharge guide surface 39. This means that the discharge guide projections 41 reduce a contact area of the adhesive surface Pb of the recording paper P with the discharge guide surface 39. As a result, when the recording paper P passes through the second guide portion 25, the discharge guide projections 41 reduce a friction force generated between the adhesive surface Pb of the recording paper P and the discharge guide surface 39.

The two discharge rollers 37 are provided so as to be arranged in the Y direction, that is, the feeding direction of the recording paper P. Note that the end portion of each discharge roller 37 in the +Z direction and the end portion of each discharge guide projection 41 in the +Z direction are located at a substantially same position in the Z direction. As the discharge roller 37 comes into contact with the adhesive surface Pb of the recording paper P when the recording paper P passes through the second guide portion 25, the discharge roller 37 rotates. As a result, when the recording paper P passes through the second guide portion 25, the discharge roller 37 reduces a friction force generated between the adhesive surface Pb of the recording paper P and the discharge roller 37.

Here, since the movable blade 29 of the cutter 19 is provided on a side opposite to the second guide portion 25 with respect to the feeding route 27, when the recording paper P is cut, the recording paper P is pressed against the discharge guide surface 39 of the second guide portion 25 by the movable blade 29. As a result, the adhesive surface Pb of the recording paper P easily adheres to the discharge guide surface 39.

On the other hand, in the present embodiment, as described above, since the discharge guide projection 41 and the discharge roller 37 are provided in the second guide portion 25, when the recording paper P passes through the second guide portion 25, a friction force generated between the adhesive surface Pb of the recording paper P and the discharge guide surface 39 or the discharge roller 37 is reduced, as a result of which the adhesive surface Pb of the recording paper P can be suppressed from adhering to the discharge guide surface 39. In addition, the user can smoothly take out the recording paper P that has been cut from the discharge outlet 9.

By the way, in the rolled paper R wound with the recording paper P, as described above, the recording surface Pa and the adhesive surface Pb are in contact with each other. Accordingly, on the recording paper P drawn from the rolled paper R, an adhesive transferred from the adhesive surface Pb may remain, and the recording surface Pa may adhere to a member that comes into contact with the recording surface Pa. In particular, since the first portion 21 and the second portion 23 are provided between the thermal head 13 and the discharge outlet 9 and come into contact with the recording surface Pa of the recording paper P whose adhesive force is increased by being heated by the thermal head 13, the recording surface Pa easily adheres to the first portion 21 and the second portion 23.

Therefore, in the present embodiment, as described below, the recording surface Pa of the recording paper P is suppressed from adhering to even the first portion 21 and the second portion 23.

Figure 4:
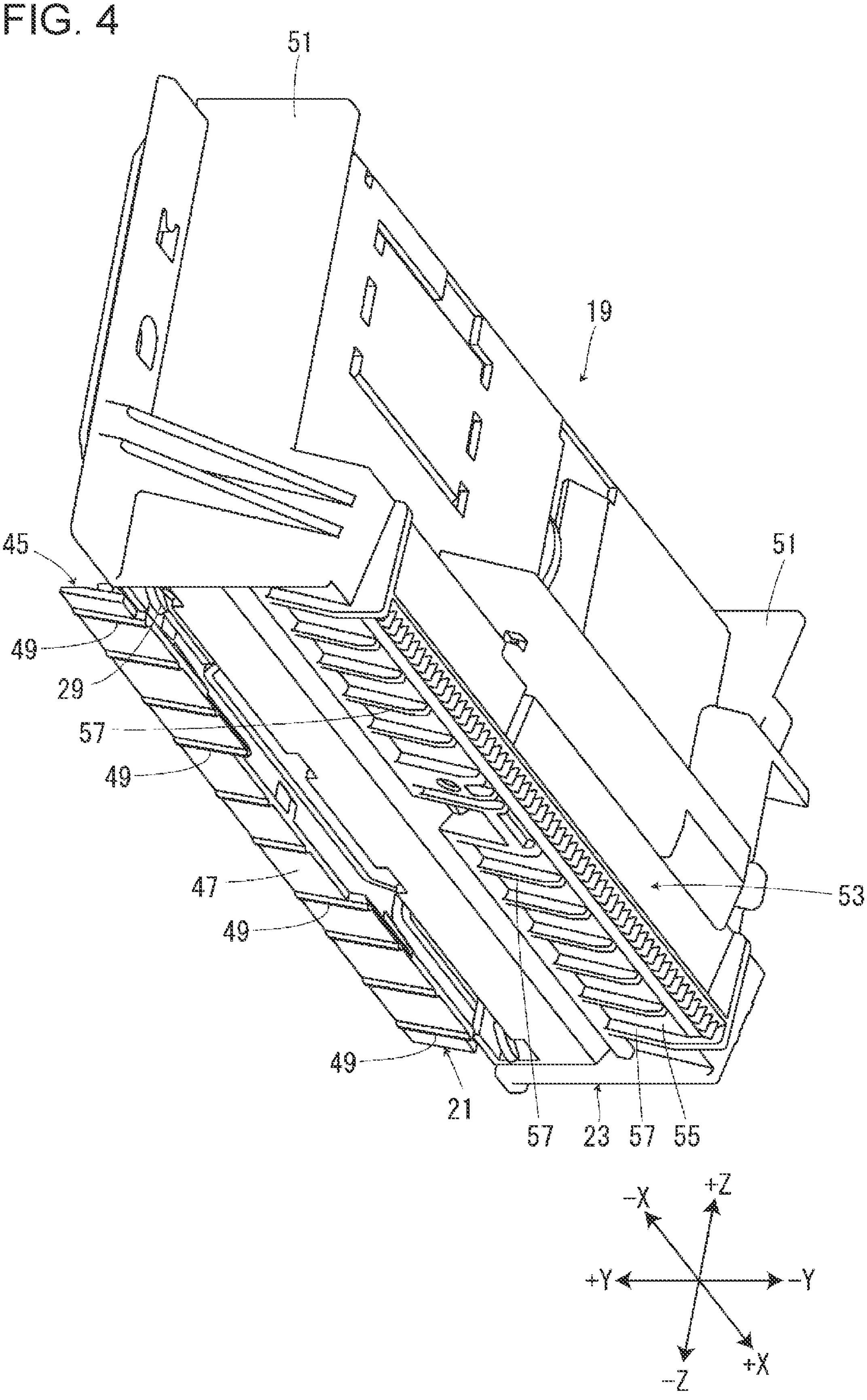
FIG. 4 is a perspective view of a first portion and a second portion.
Figure 5:
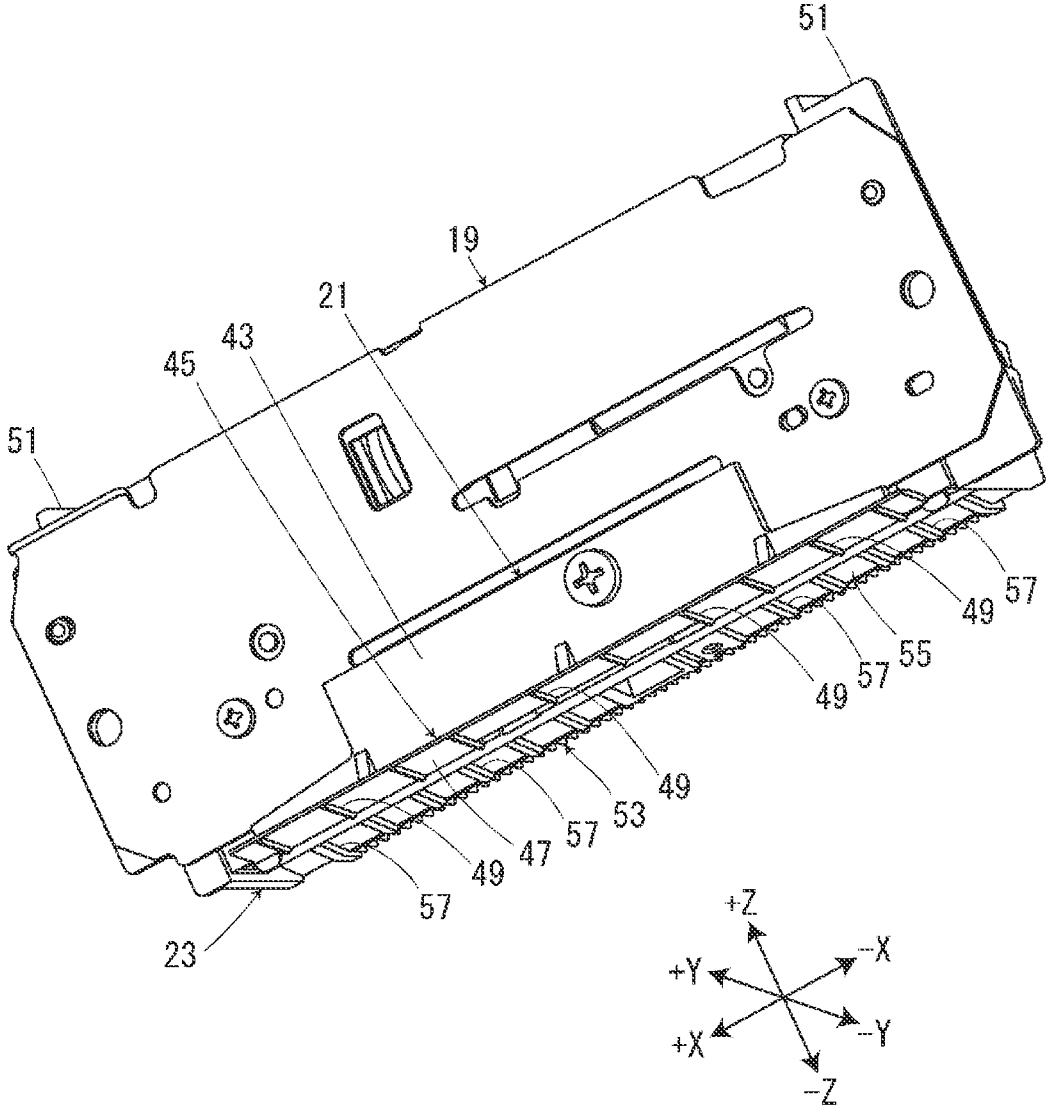
FIG. 5 is a perspective view of the first portion and the second portion viewed from a different angle from FIG. 4.
Figure 6:
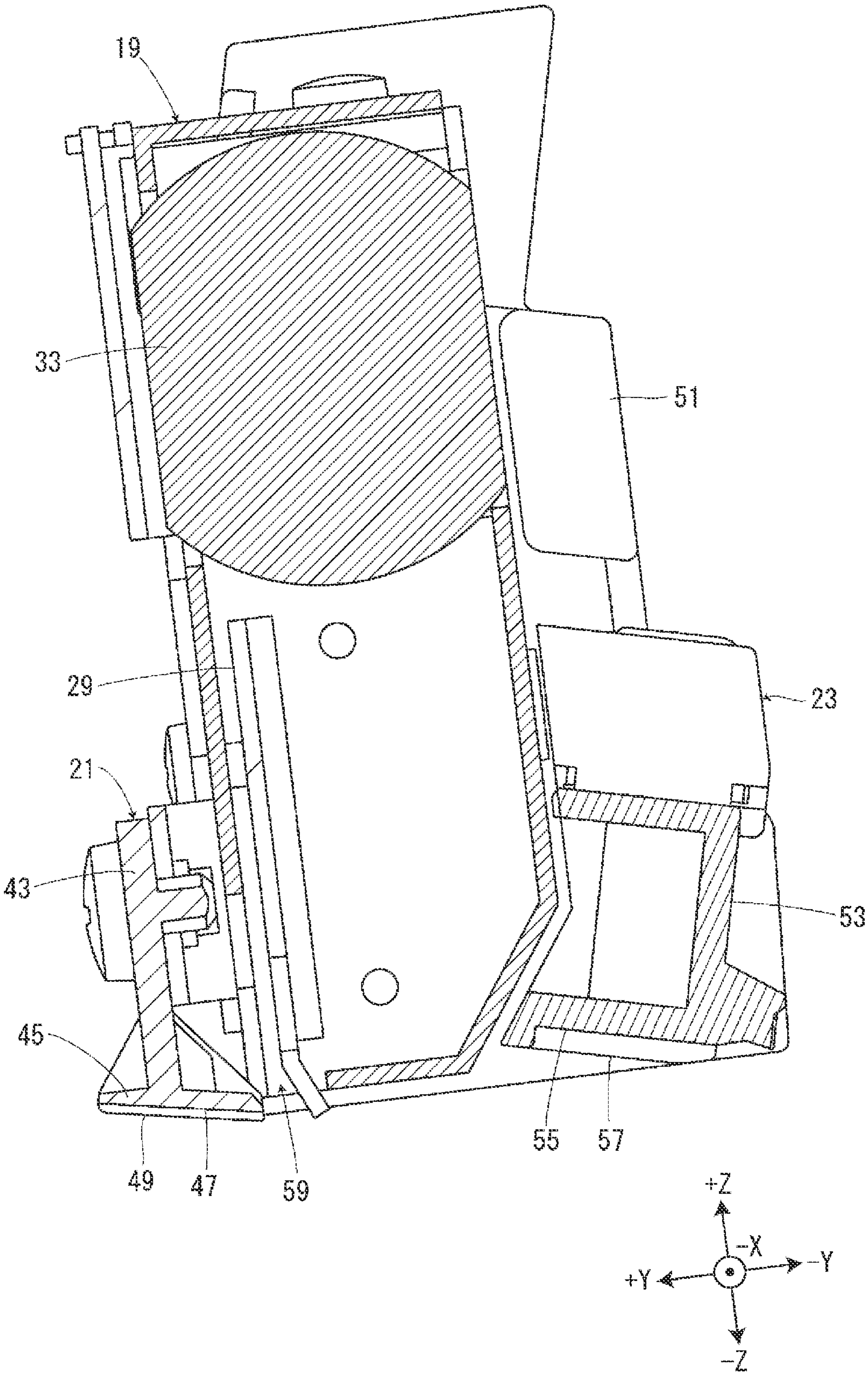
FIG. 6 is a cross sectional view of the first portion and the second portion.

As illustrated in FIGS. 4 to 6, the first portion 21 includes a first attaching portion 43 and a first guide main body 45. The first attaching portion 43 is formed in a substantially rectangular plate shape that is substantially parallel to the XZ plane and is attached to a surface of the cutter 19 in the +Y direction.

The first guide main body 45 is provided at an end portion of the first attaching portion 43 in the −Z direction. The first guide main body 45 is formed in a substantially rectangular plate shape that is parallel to the XY plane. The surface of the first guide main body 45 in the −Z direction, that is, the surface facing the recording surface Pa of the recording paper P fed along the feeding route 27 is called a first guide surface 47. The first guide surface 47 is inclined in the −Z direction from the +Y direction to the −Y direction with respect to the XY plane that is parallel to the feeding route 27. This means that the end portion, of the first guide surface 47, on the discharge outlet 9 side is located closer to the feeding route 27 than the end portion on the platen roller 11 side.

From the first guide surface 47, a plurality of first guide projections 49 is arranged in the X direction, that is, the width direction of the recording paper P and is projecting. The first guide projections 49 are formed in a rib shape extending in the Y direction, that is, the feeding direction of the recording paper P. The recording surface Pa of the recording paper P comes into contact only with the first guide projections 49 of the first guide surface 47. This means that the first guide projections 49 reduce a contact area of the recording surface Pa of the recording paper P with the first guide surface 47. As a result, when the recording paper P passes through the first portion 21, the first guide projections 49 reduce a friction force generated between the recording surface Pa of the recording paper P and the first guide surface 47.

The second portion 23 includes two second attaching portions 51 and a second guide main body 53. The two second attaching portions 51 are attached to the cutter 19 so as to sandwich the cutter 19 in the X direction.

The second guide main body 53 is provided between the end portions of the two second attaching portions 51 in the −Z direction so as to be located in the −Y direction with respect to the cutter 19. The surface of the second guide main body 53 in the −Z direction, that is, the surface facing the recording surface Pa of the recording paper P fed along the feeding route 27 is called a second guide surface 55. The second guide surface 55 is inclined in the −Z direction from the +Y direction to the −Y direction with respect to the XY plane that is parallel to the feeding route 27. This means that the end portion, of the second guide surface 55, on the discharge outlet 9 side is located closer to the feeding route 27 than the end portion on the platen roller 11 side.

From the second guide surface 55, a plurality of second guide projections 57 is arranged in the X direction, that is, the width direction of the recording paper P and is projecting. The second guide projections 57 are formed in a rib shape extending in the Y direction, that is, the feeding direction of the recording paper P. The recording surface Pa of the recording paper P comes into contact only with the second guide projections 57 of the second guide surface 55. This means that the second guide projections 57 reduce a contact area of the recording surface Pa of the recording paper P with the second guide surface 55. As a result, when the recording paper P passes through the second portion 23, the second guide projections 57 reduce a friction force generated between the recording surface Pa of the recording paper P and the second guide surface 55.

By the way, the recording paper P drawn from the rolled paper R easily warps in a direction in which the recording surface Pa is recessed. It is considered that this is because, since no mount is affixed on the adhesive surface Pb, when the recording paper P is peeled off from the rolled paper R, the adhesive applied to the adhesive surface Pb is stretched out and the shape is stored even after the recording paper P is peeled off. Accordingly, the recording paper P moves in the +Z direction when being fed along the feeding route 27, as a result of which the recording paper P may enter a gap provided in the +Z direction with respect to the feeding route 27, for example, an opening 59 (see FIG. 6) where the movable blade 29 appears.

On the other hand, in the present embodiment, as described above, since the first guide surface 47 and the second guide surface 55 are inclined in the −Z direction from the +Y direction to the −Y direction, the recording paper P is suppressed from moving in the +Z axis direction.

As described above, according to the printer 1 of the present embodiment, since the first guide projections 49 and the second guide projections 57 are provided in the first portion 21 and the second portion 23 that come into contact with the recording surface Pa of the recording paper P, respectively, the friction force generated between the recording surface Pa of the recording paper P, and the first portion 21 and the second portion 23 is reduced. As a result, paper jamming caused by adhesion of the recording surface Pa of the recording paper P to the first portion 21 and the second portion 23 can be suppressed from occurring.

Other Modifications

It is evident that the present disclosure is not limited to the above-described embodiment and various configurations can be adopted without departing from the gist of the present disclosure. For example, the above-described embodiment can be changed to the following embodiments, in addition to the above-described one. Moreover, a configuration combining each of the embodiments and modifications may be used.

The first portion 21 is not limited to having a configuration including the first guide projections 49 projecting from the first guide surface 47 and may have a configuration including a means for reducing the friction force generated between the recording surface Pa of the recording paper P and the first portion 21. For example, the first portion 21 may have a configuration including a groove on the first guide surface 47, a configuration of a surface on which low friction surface treatment, such as fluorine treatment, is performed on the first guide surface 47, or a configuration including a roller like the discharge roller 37. These modifications can be applied to the second portion 23 in the same manner. As described above, a first friction reduction portion is a concept including a groove, low friction surface treatment, a roller, and the like, in addition to a projection, and the first portion 21 and the second portion 23 each, as the first friction reduction portion, may have a configuration including one or two or more of the projection, the groove, the low friction surface treatment, the roller, and the like. Note that the friction reduction portion may be described as an adhesion suppression portion.

The second guide portion 25 is not limited to having a configuration including the discharge roller 37 and the discharge guide projections 41 projecting from the discharge guide surface 39 and may have a configuration including a means for reducing the friction force generated between the adhesive surface Pb of the recording paper P and the second guide portion 25. For example, the second guide portion 25 may have a configuration including a groove provided on the discharge guide surface 39, or a configuration of a surface on which low friction surface treatment, such as fluorine treatment, is performed on the discharge guide surface 39. As described above, a second friction reduction portion is a concept including a groove, low friction surface treatment, and the like, in addition to a projection and a roller, and the second guide portion 25, as the second friction reduction portion, may have a configuration including one or two or more of the projection, the groove, the low friction surface treatment, the roller, and the like.

The printer 1 is not limited to having a configuration including both of the first portion 21 and the second portion 23 and may have a configuration including either one of the first portion 21 and the second portion 23. In addition, the first portion 21 and the second portion 23 are not limited to having a configuration of being provided, in the feeding route 27, between the thermal head 13 and the discharge outlet 9 and may have a configuration in which either one or both of the first portion 21 and the second portion 23 are provided between the rolled paper holder 7 and the thermal head 13.

The printer 1 may have a configuration including, instead of the thermal head 13, for example, an ink jet head that discharges ink by an ink jet method. This means that a printing head is a concept including an ink jet head, in addition to the thermal head 13.

Supplementary Notes

Hereinafter, supplementary notes of a printer will be added. A printer includes a rolled paper holder that accommodates rolled paper wound with recording paper having a recording surface and an adhesive surface provided on a side opposite to the recording surface, a feeding roller that comes into contact with the adhesive surface and draws and feeds the recording paper from the rolled paper, a printing head that performs printing on the recording surface, and a first guide portion that comes into contact with the recording surface and guides the recording paper, and the first guide portion has a first friction reduction portion that reduces a friction force generated between the recording surface and the first guide portion.

According to this configuration, since the first friction reduction portion is provided in the first guide portion that comes into contact with the recording surface of the recording paper, the friction force generated between the recording surface of the recording paper and the first guide portion is reduced. As a result, paper jamming caused by adhesion of the recording surface of the recording paper to the first guide portion can be suppressed from occurring. Note that the platen roller 11 is one example of the feeding roller. The first portion 21 is one example of the first guide portion. Similarly, the second portion 23 is one example of the first guide portion.

In this case, it is preferable that the first friction reduction portion includes a projection that projects from a surface, of the first guide portion, facing the recording surface and comes into contact with the recording surface.

According to this configuration, a simple configuration can reduce the friction force generated between the recording surface and the first guide portion. Note that the first guide projections 49 are one example of the projection. Similarly, the second guide projections 57 are one example of the projection. In addition, the first guide surface 47 is one example of the surface facing the recording surface. Similarly, the second guide surface 55 is one example of the surface facing the recording surface.

In this case, it is preferable that the printing head is a thermal head having a plurality of heating elements, and the first guide portion is provided, in the feeding route of the recording paper, between the printing head and the discharge outlet from which the recording paper is discharged.

According to this configuration, although the first guide portion comes into contact with the recording surface of the recording paper whose adhesive force is increased by being heated by the thermal head, since the first guide portion has the first friction reduction portion, the recording surface of the recording paper can be suppressed form adhering to the first guide portion.

In this case, it is preferable that a cutter that is provided, in the feeding route, between the printing head and the discharge outlet and cuts the recording paper is included, a first portion is included as the first guide portion, and the first portion is provided, in the feeding route, between the printing head and the cutter.

According to this configuration, the recording surface of the recording paper can be suppressed from adhering to the first portion provided between the printing head and the cutter.

In this case, it is preferable that the first portion and a second portion are included as the first guide portion, and the second portion is provided, in the feeding route, between the cutter and the discharge outlet.

According to this configuration, the recording surface of the recording paper can be suppressed from adhering to the first portion provided between the printing head and the cutter, and the second portion provided between the cutter and the discharge outlet.

In this case, it is preferable that, in the feeding route of the recording paper, the second guide portion that is provided between the feeding roller and the discharge outlet from which the recording paper is discharged, comes into contact with the adhesive surface, and guides the recording paper is included, and the second guide portion has a second friction reduction portion that reduces a friction force generated between the adhesive surface and the second guide portion.

According to this configuration, since the second friction reduction portion is provided in the second guide portion that comes into contact with the adhesive surface of the recording paper, the friction force generated between the adhesive surface of the recording paper and the second guide portion is reduced. As a result, paper jamming caused by adhesion of the adhesive surface of the recording paper to the second guide portion can be suppressed from occurring.

A printer includes a rolled paper holder that accommodates rolled paper wound with recording paper having a recording surface and an adhesive surface provided on a side opposite to the recording surface, a feeding roller that comes into contact with the adhesive surface and draws and feeds the recording paper from the rolled paper, a printing head that is provided on a side opposite to the feeding roller with respect to a feeding route along which the recording paper is fed and performs printing on the recording surface, and a first guide portion that is provided on the same side as the printing head with respect to the feeding route and guides the recording paper, and the first guide portion has a first friction reduction portion that reduces a friction force generated between the recording surface and the first guide portion.

According to this configuration, since the first guide portion provided on the same side as the printing head with respect to the feeding route is provided with the first friction reduction portion, the friction force generated between the recording surface of the recording paper and the first guide portion is reduced. As a result, paper jamming caused by adhesion of the recording surface of the recording paper to the first guide portion can be suppressed from occurring.

What is claimed is:

1. A printer comprising:
a rolled paper holder configured to accommodate rolled paper wound with recording paper having a recording surface and an adhesive surface provided on a side opposite to the recording surface;
a feeding roller configured to come into contact with the adhesive surface and configured to draw and feed the recording paper from the rolled paper;
a printing head configured to perform printing on the recording surface;
a cutter that is provided, in a feeding route of the recording paper, between the printing head and a discharge outlet from which the recording paper is discharged and cuts the recording paper; and
a first guide portion configured to come into contact with the recording surface and configured to guide the recording paper, wherein
the first guide portion is configured to have a first friction reduction portion that reduces a friction force generated between the recording surface and the first guide portion, and
the first guide portion includes a first portion attached to the cutter and provided, in the feeding route, between the printing head and the cutter.

2. The printer according to claim 1, wherein
the first friction reduction portion includes a projection that projects from a surface, of the first guide portion, facing the recording surface and comes into contact with the recording surface.

3. The printer according to claim 1, wherein
the printing head is a thermal head having a plurality of heating elements, and
the first guide portion is provided, in the feeding route, between the printing head and the discharge outlet.

4. The printer according to claim 1, wherein
the first guide portion further includes a second portion, and
the second portion is provided, in the feeding route, between the cutter and the discharge outlet.

5. The printer according to claim 1, further comprising
a second guide portion that is provided, in the feeding route, between the feeding roller and a discharge outlet from which the recording paper is discharged, comes into contact with the adhesive surface, and guides the recording paper, wherein
the second guide portion has a second friction reduction portion that reduces a friction force generated between the adhesive surface and the second guide portion.

6. A printer comprising:
a rolled paper holder configured to accommodate rolled paper wound with recording paper having a recording surface and an adhesive surface provided on a side opposite to the recording surface;
an apparatus body configured to have the rolled paper holder;
an opening/closing cover being coupled to the apparatus body;
a feeding roller provided on the opening/closing cover and configured to draw and feed the recording paper from the rolled paper;
a printing head provided in the apparatus body and configured to perform printing on the recording surface;
a cutter that is provided, in a feeding route of the recording paper, between the printing head and a discharge outlet from which the recording paper is discharged and cuts the recording paper; and
a first guide portion provided in the apparatus body and configured to guide the recording surface, wherein
the first guide portion is configured to have a projection, and
the first guide portion includes a first portion attached to the cutter and provided, in the feeding route, between the printing head and the cutter.

7. The printer according to claim 6, further comprising
a relay roller that is provided on the opening/closing cover and guides the adhesive surface at a position upstream of the feeding roller, in a feeding direction of the recording paper.

8. The printer according to claim 6, wherein
the printing head is a thermal head having a plurality of heating elements, and
the first guide portion is provided downstream of the printing head, in a feeding direction of the recording paper.

9. The printer according to claim 6, wherein
the first guide portion is provided downstream of the cutter, in a feeding direction of the recording paper.

10. The printer according to claim 6, further comprising
a second guide portion that is provided on the opening/closing cover, comes into contact with the adhesive surface, and guides the adhesive surface, wherein
the second guide portion has a projection that is configured to come into contact with the adhesive surface.

11. A printer comprising:
a rolled paper holder configured to accommodate rolled paper wound with recording paper having a recording surface and an adhesive surface provided on a side opposite to the recording surface;
a feeding roller configured to come into contact with the adhesive surface and configured to draw and feed the recording paper from the rolled paper;
a printing head configured to perform printing on the recording surface; and
a first guide portion configured to come into contact with the recording surface and configured to guide the recording paper, wherein
the first guide portion is configured to have a first friction reduction portion that reduces a friction force generated between the recording surface and the first guide portion,
the first friction reduction portion is configured to extend toward a discharge outlet from which the recording paper is discharged, and
an end portion of the first friction reduction portion on the discharge outlet side is located closer to a feeding route of the recording paper than an end portion on the feeding roller side.

* * * * *